US012012067B2

(12) United States Patent
Godet et al.

(10) Patent No.: US 12,012,067 B2
(45) Date of Patent: Jun. 18, 2024

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventors: Sylvain Godet, Toulouse (FR); Stéphane Billy, Toulouse (FR); Clément Ferry, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/277,107

(22) PCT Filed: Apr. 5, 2022

(86) PCT No.: PCT/EP2022/059007
§ 371 (c)(1),
(2) Date: Aug. 14, 2023

(87) PCT Pub. No.: WO2022/214482
PCT Pub. Date: Oct. 13, 2022

(65) Prior Publication Data
US 2024/0132015 A1    Apr. 25, 2024

(30) Foreign Application Priority Data

Apr. 9, 2021 (FR) ...................................... 2103666

(51) Int. Cl.
*B60R 25/01* (2013.01)
*B60R 25/24* (2013.01)
(Continued)

(52) U.S. Cl.
CPC .............. *B60R 25/01* (2013.01); *B60R 25/24* (2013.01); *B60R 25/31* (2013.01); *G01S 13/04* (2013.01);
(Continued)

(58) Field of Classification Search
CPC .......... B60R 25/01; B60R 25/24; B60R 25/31
See application file for complete search history.

(56) References Cited

U.S. PATENT DOCUMENTS

2018/0099643 A1* 4/2018 Golsch .................. G01S 13/765
2018/0234797 A1* 8/2018 Ledvina .................. B60R 25/24
(Continued)

FOREIGN PATENT DOCUMENTS

WO    2020099646 A1    5/2020

OTHER PUBLICATIONS

International Search Report and Written Opinion for International Application No. PCT/EP2022/059007, mailed Jul. 21, 2022, 7 pages.
(Continued)

*Primary Examiner* — Nabil H Syed
(74) *Attorney, Agent, or Firm* — BUCHANAN INGERSOLL & ROONEY PC

(57) ABSTRACT

A method for activating a function of a motor vehicle by an activation device on the vehicle having at least one communication unit including at least one radiofrequency antenna and transmission and reception device. The activation coming from a user's portable device. The activation of the function is triggered by detection of the user's presence in a predetermined zone around the vehicle and on the basis of a result of authentication of the portable device by the vehicle. For at least two responses received from the portable device: a) comparing, for each response, a power of a first wave received at a time with a maximum power of the components of the first wave received, b) determining, for each response, a presence or absence of reflected waves, c) determining an averaged reflection rate for the responses, d) determining a minimum value for the time from the responses, e) if the averaged reflection rate is zero or full,
(Continued)

then the user's presence in the predetermined area is determined using the minimum value for the time, f) if the averaged reflection rate is partial, then the user's presence in the predetermined area is detected using the minimum value for the time, to which a corrective coefficient is applied.

12 Claims, 5 Drawing Sheets

(51) Int. Cl.
  *B60R 25/31* (2013.01)
  *G01S 13/04* (2006.01)
(52) U.S. Cl.
  CPC ....... *B60R 2325/10* (2013.01); *B60R 2325/20* (2013.01)

(56) References Cited

U.S. PATENT DOCUMENTS

2020/0309932 A1   10/2020   Zeng et al.
2022/0099816 A1*  3/2022    Eber ................... G01S 11/02

OTHER PUBLICATIONS

International Search Report and Written Opinion for International Application No. PCT/EP2022/059007, mailed Jul. 21, 2022, 10 pages (French).
French Search Report for French Application No. 2103666, dated Jan. 21, 2022 with translation, 9 pages.
English Translation of the Written Opinion for International Application No. PCT/EP2022/059007, mailed Jul. 21, 2022, 4 pages.

* cited by examiner

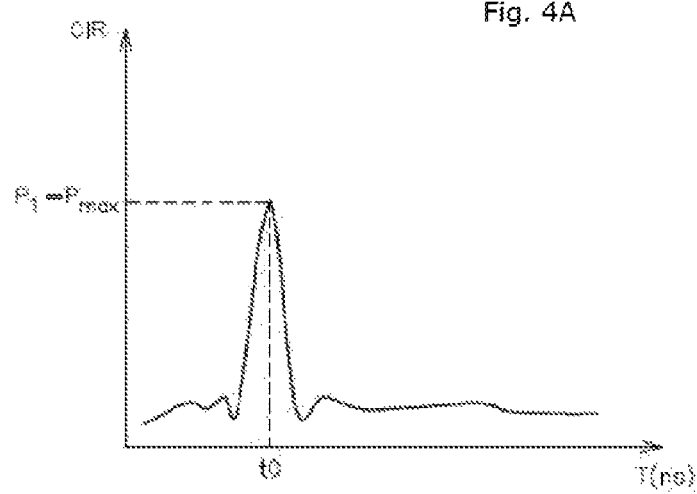
Fig. 4A
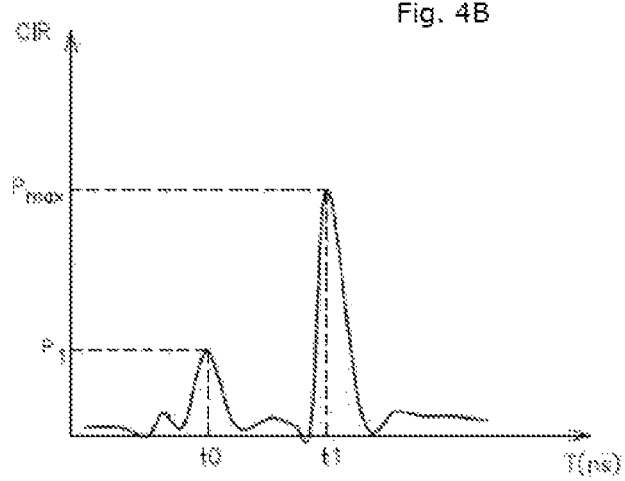
Fig. 4B
Fig. 5A
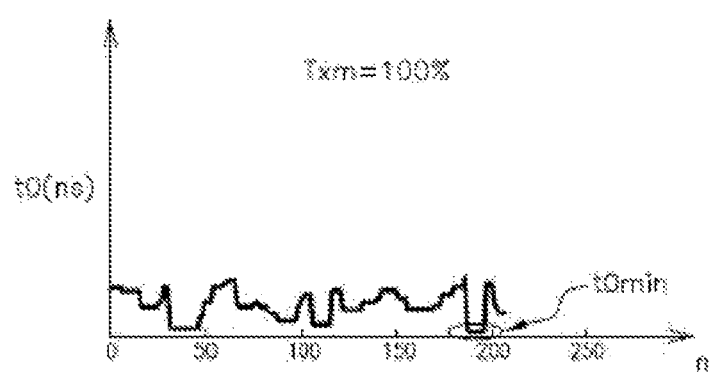

METHOD FOR ACTIVATING A VEHICLE FUNCTION AND ASSOCIATED ACTIVATION DEVICE

CROSS REFERENCE TO RELATED APPLICATIONS

This application is the U.S. National Phase Application of PCT International Application No. PCT/EP2022/059007, filed Apr. 5, 2022, which claims priority to French Patent Application No. 2103666, filed Apr. 9, 2021, the contents of such applications being incorporated by reference herein.

FIELD OF THE INVENTION

The present invention relates to the field of motor vehicles and more specifically relates to a method for activating a function of a motor vehicle. The invention particularly applies to the function of locking and unlocking the doors of a motor vehicle.

BACKGROUND OF THE INVENTION

In a motor vehicle, the use of presence detection devices is known in order to detect the presence of a hand or a foot of a user of the vehicle and thus allow locking or unlocking of all or some of the doors of the vehicle, for example, the doors or the trunk. By way of an example, detecting the presence of a hand of a user on or in front of a door handle, combined with the recognition of an identifier of a "hands-free" access device carried by this user, allows these doors to be locked and unlocked.

A "hands-free" access system for accessing a motor vehicle allows an authorized user to lock and/or unlock the doors of their vehicle without having to physically press buttons on a key. To this end, the vehicle identifies a portable device such as a fob or remote control or even a key carried by the user, and if the fob or the remote control or even the key is located in a predetermined zone around the vehicle or in the vehicle and is identified as belonging to the vehicle, then the vehicle automatically locks/unlocks its doors depending on the intention of the user, without the user having to physically manipulate a key.

For this purpose, when the user approaches the vehicle, communication is established over a wireless communication link between the access device, for example, an electronic fob or a mobile phone, and the activation device, in order to authenticate said access device by virtue of its identifier.

To this end, the activation device comprises an antenna for receiving the identifier sent by the access device. The activation device is connected to an electronic computer of the vehicle ("ECU: "Electronic Control Unit") to which it transmits the identifier.

In the prior art, the access device is usually an electronic fob. The signal received by the antenna of the activation device, comprising the identifier of the access device, is sent via radio frequency (RF) or low frequency (LF) waves. The precise location of the portable device around the vehicle is found by measuring the intensity of the LF signal received by the portable device (via the antennas and the electronic control unit) originating from the vehicle, more commonly called RSSI ("Received Signal Strength Indicator") measurements. The measurement of the strength of the signal received by the portable device from each LF antenna is received and analyzed by an activation device on board the vehicle, which thus determines the position of the portable device relative to said LF antennas, i.e., relative to the vehicle.

Depending on the location of the portable device identified by the vehicle, in said location zones some actions specific to said location zones are automatically carried out, such as unlocking/locking or preliminary switching-on of the passenger compartment lighting (also called "welcome lighting").

At the present time, however, it is increasingly common for a mobile phone to be used for carrying out authentication functions, thus avoiding the use of a dedicated electronic fob, thus limiting the number of devices. Most mobile phones do not have LF communication means. The "hands-free" access and/or starting system therefore must be adapted to a vehicle so that it can also operate with a mobile phone using other communication standards, such as, for example, ultra-wideband, and not only by means of low frequency (LF) radio waves. Ultra-wideband (UWB) is a radio modulation technique that is based on the transmission of pulses with a very short duration, often of less than one nanosecond. Thus, the bandwidth can reach very high values.

However, locating the portable device using ultra-wideband has some disadvantages: the conventional method involves using the maximum strength of the signal sent by the portable device and received by the antenna located on the vehicle in order to determine the distance between the portable device and the vehicle. However, in an automotive environment, the signal is generally transmitted by taking several propagation paths between the portable device and the antenna of the vehicle. Thus, the signals can be attenuated because they have been reflected by one or more metal walls.

Another method of the prior art uses the time of flight of the signal between the portable device and the antenna of the vehicle, in order to estimate the distance between the two. Then, triangulation or trilateration methods using at least three antennas located on the vehicle allow the position of the portable device to be determined. However, a significant error rate in the measurement of the time of flight (in this case due to the reflections experienced by the signal) deteriorates the quality of the location of the portable device and generates a high degree of inaccuracy with respect to the final determination of the positioning of said device with respect to the vehicle.

It is therefore necessary to be able to accurately determine the location of the portable device relative to the vehicle using ultra-wideband in order to activate the one or more appropriate functions.

SUMMARY OF THE INVENTION

An aspect of the invention proposes a method for activating a vehicle function allowing the disadvantages of the prior art to be overcome, in this case allowing the location of the portable device relative to the vehicle to be accurately determined in order to activate the corresponding vehicle function at the location of said equipment.

An aspect of the invention proposes a method for activating a function of a motor vehicle using an activation device comprising at least one communication unit, itself comprising at least one radiofrequency antenna and transmission and reception means and intended to be placed on-board said vehicle and the activation coming from a portable device carried by a user, with the activation of the function being triggered by the detection of the presence of the user in a predetermined zone around the vehicle, and as a function of an authentication result of the portable device by the vehicle, the method being characterized in that, with the activation device and the portable device communicating with each other by ultra-wideband, for at least two responses received from the portable device:

a. for each response, a strength of a first wave received at a time is compared with a maximum strength of the components of the first received wave;
b. for each response, the presence or the absence of reflected waves is determined as a function of said comparison;
c. a mean reflection rate is determined on the responses;
d. a minimum value of the time is determined from among the responses;
e. if the mean reflection rate is zero or total, then the presence of the user in the predetermined zone is determined using the minimum value of the time;
f. if the mean reflection rate is partial, then the presence of the user is detected in the predetermined zone, using the minimum value of the time to which a correction coefficient is applied.

Advantageously, the method is repeated for a plurality of responses.

Preferably,
a. if the strength of the first wave is equal to the maximum strength then reflected waves are not present and a zero reflection rate equal to 0 is assigned to the response; and
b. if the difference between the strength of the first wave and the maximum strength is greater than a predetermined threshold then reflected waves are present and a total reflection rate of 1 is assigned to the response.

Appropriately, the partial mean reflection rate is strictly greater than 0% and strictly less than 100%.

According to an aspect of the invention, the correction coefficient ranges between 0.6 and 0.8.

Preferably, the correction coefficient is equal to $(\sqrt{2})/2$.

An aspect of the invention also relates to an activation device for activating a vehicle function from a portable device carried by a user, the activation device comprising at least one communication unit itself comprising at least one radiofrequency antenna and transmission and reception means and being intended to be placed on-board said motor vehicle, with the activation of the function being triggered by the detection of the presence of the user in a predetermined zone around the vehicle, and as a function of an authentication result of the portable device, the activation device being characterized in that it comprises ultra-wideband communication means, and in that it is adapted, for at least two responses received from the portable device:

a. to compare, for each response, a strength of a first wave received at a time with a maximum strength of the components of the first received wave;
b. to determine, for each response, the presence or the absence of reflected waves as a function of the result of the comparison;
c. to compute a mean reflection rate on the responses;
d. to determine a minimum value of the time from among the responses;
e. to detect, as a function of the mean reflection rate, the presence of the user in the predetermined zone using the minimum value of the time, or the minimum value of the time to which a corrective coefficient is applied.

The device is further adapted to detect the presence of the user in a predetermined zone for a plurality of responses.

The device is further adapted to assign a reflection rate to each response that is equal to 0 or to 1 as a function of the result of the comparison, the reflection rate is equal to 0 in the case of the absence of reflected waves, and said rate is equal to 1 in the case of the presence of reflected waves.

Appropriately, the correction coefficient ranges between 0.6 and 0.8.

Preferably, the correction coefficient is equal to $(\sqrt{2})/2$.

An aspect of the invention also relates to any motor vehicle comprising an activation device according to any one of the features listed above.

BRIEF DESCRIPTION DRAWINGS

Further features and advantages of aspects of the invention will become more apparent upon reading the following description. This description is purely illustrative and should be read with reference to the appended drawings, in which:

FIG. 1 schematically shows a user carrying a portable device in the vicinity of a vehicle comprising an activation device D according to an aspect of the invention;

FIG. 2 schematically shows an activation device D according to an aspect of the invention;

FIG. 3 schematically shows, on the left, a case of zero reflection and, on the right, a case of total reflection of the waves emitted by the portable device and received by a communication unit of the activation device;

FIG. 4A is a graph showing the strength received by a communication unit of the waves emitted by the portable device over time, in the case of zero reflection;

FIG. 4B is a graph showing the strength, received by a communication unit, of the waves emitted by the portable device over time, in the case of total reflection;

FIG. 5A is a graph showing the reception times of the first wave for a plurality of responses in the case of a total mean reflection rate;

Figure 7:
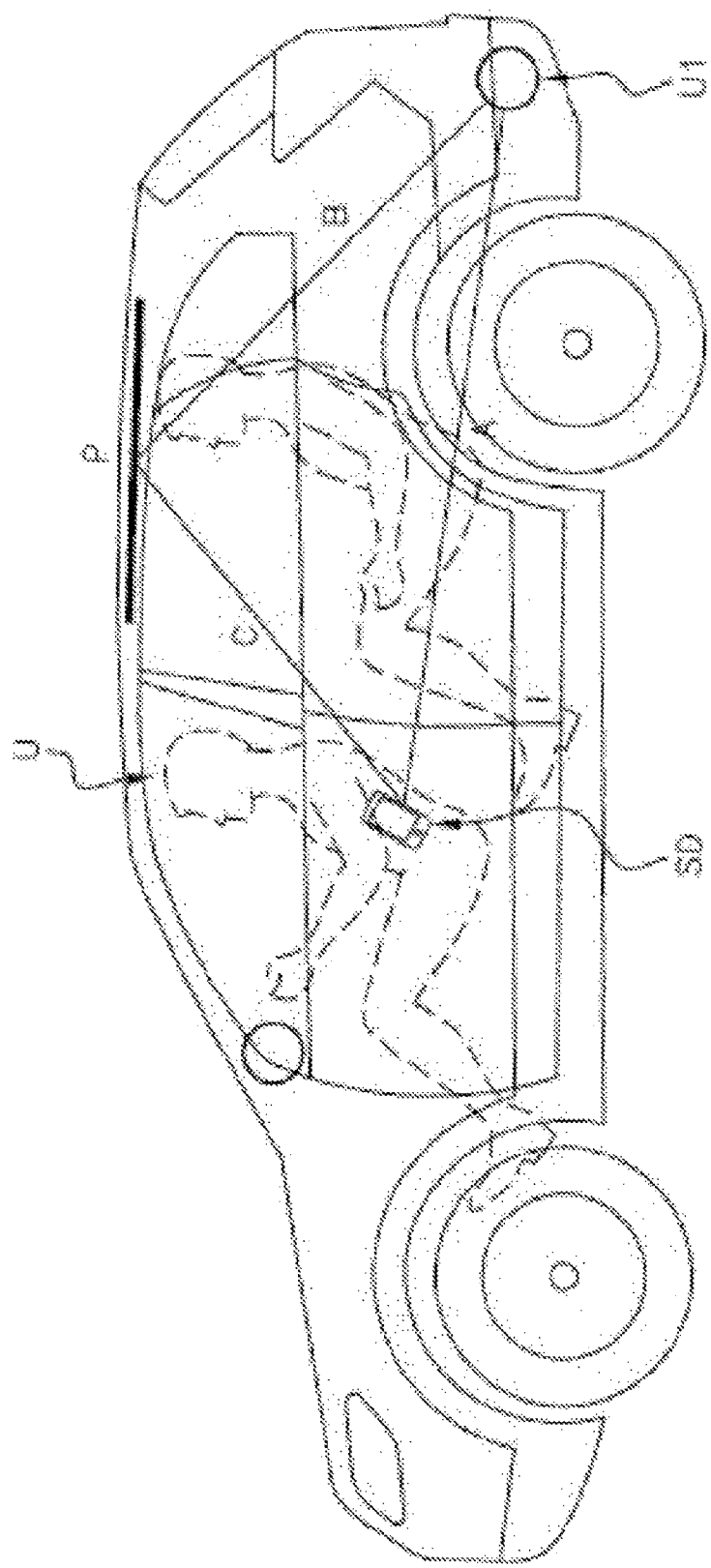

FIG. 7 schematically shows the passenger compartment of a vehicle and two propagation paths of a wave of a portable device to a communication unit, with a path A illustrating a case of zero reflection, and a path B illustrating a case B of total reflection.

DETAILED DESCRIPTION OF THE PREFERRED EMBODIMENTS

Figure 1:
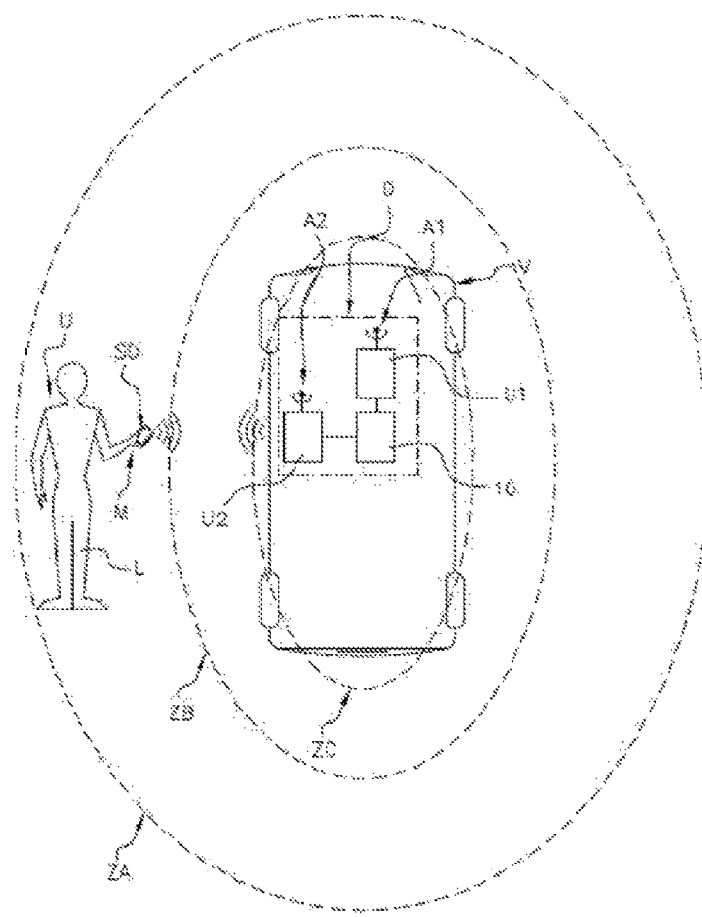

FIG. 1 shows a vehicle V and a user U carrying a portable user device SD in their hand, such as, for example, a smartphone.

The vehicle V for its part is equipped with an activation device D adapted to:
a. detect the presence of a user U carrying the portable device SD, in a predetermined zone ZA, ZB, ZC around the vehicle V;
b. authenticate the portable device SD carried by the user U, in order to activate a vehicle function.

"Vehicle function" is understood to mean locking/unlocking the doors of the vehicle V, such as the door of the driver or the rear trunk of the vehicle V, but also switching on heated seats, switching on ceiling lighting ("welcome lighting"), or even pre-adjusting seats or pre-tuning a radio station, even before the user U has entered the vehicle.

Figure 2:
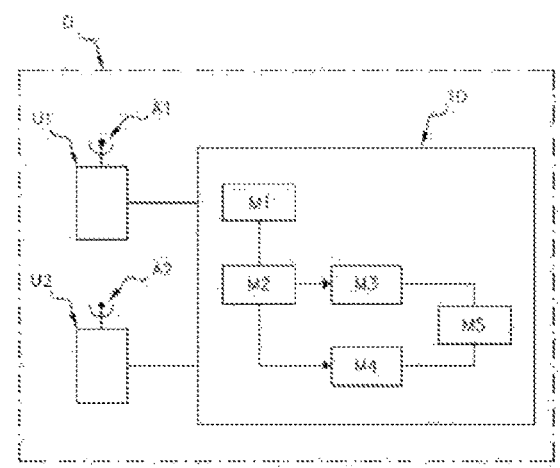

The activation device D comprises at least one communication unit U1, i.e., an ultra-wideband transceiver comprising at least one ultra-wideband antenna A1. There also can be several antennas and several units. FIG. 2 shows two communication units U1, U2, each comprising an antenna A1, A2. The device D also comprises an electronic central unit 10 on board the vehicle V, itself connected to the communication units (transceivers) U1, U2, but also to means (not shown) for triggering the one or more vehicle functions. The central unit 10, depending on the information it receives from the communication units, i.e., transceivers U1, U2, namely, the presence or otherwise of a user U carrying the portable device SD in a predetermined zone ZA, ZB, ZC, and the success or failure of the authentication of said device SD, then controls the means for triggering the unlocking/locking of the doors, for switching on the heated seats, for pre-adjusting the seats or pre-tuning the radio stations, etc.

Ultra-wideband (UWB) is understood to mean a frequency band preferably ranging between 5 GHz and 8 GHz over a frequency range that is preferably 500 MHz.

The activation device D is preferably located in the door or near the door if the function to be activated is the locking/unlocking of the door, it can be located in a door handle of the vehicle V, in the door or a door pillar of the vehicle V, or even in the bumper or near the trunk of the vehicle V.

Depending on the predetermined zone ZA, ZB, ZC around the vehicle V, in which zone the user U carrying the authenticated portable device SD is located, the activation of one or other function can be triggered. FIG. 1 shows three predetermined zones ZA, ZB, ZC, but clearly there can be a plurality of predetermined zones around the vehicle, each at a different distance from the vehicle and each triggering the activation of a particular function.

Thus, the activation of the heating of the seats, which is a "comfort" function, can be triggered if the user U carrying the authenticated portable device SD is located in a zone ZA remote from the vehicle, i.e., a few meters away, but unlocking, which is a "security" function, can be triggered only if the user U carrying the authenticated portable device SD is in the vicinity of the door, i.e., a few centimeters away, in the zone ZB. Finally, starting the vehicle, which is another safety function, is only authorized if the user U (more specifically, the portable device SD) is located in the more restricted zone ZC covering the inside of the vehicle V.

It is therefore essential to be able to precisely determine the position of the portable device SD with respect to the vehicle V in order to activate the corresponding vehicle function and not to activate a "safety" function if it is uncertain whether the portable device SD is close enough to the vehicle V and in the appropriate zone.

FIG. 2 shows an activation device D according to an aspect of the invention, comprising two communication units U1, U2, each comprising a transceiver and an antenna A1, A2 enabling Ultra-Wide Band communication with the portable user device SD. Thus, for example, the activation device D sends a request signal to the portable device SD and said device, upon reception of this signal, in turn sends a response to the activation device D. This UWB communication mode is known to a person skilled in the art and will not be described in further detailed herein.

The communication units U1, U2 are connected to the central electronic unit 10, also called "BCM" (Body Control Module). According to an aspect of the invention, the activation device D further comprises, for at least two responses that it receives that originate from the portable device SD:

a. first means M1 for comparing, for each response Ri, a strength P1 of a first wave received at a time t0 with a maximum strength Pmax of the components of the first received wave;
b. second means M2 for determining, for each response Ri, the presence (Tx=1) or the absence (Tx=0) of reflected waves as a function of the result of the comparison;
c. third means M3 for computing a mean reflection rate Txm on the responses;
d. fourth means M4 for determining a minimum value of the time t0min from among the responses Ri;
e. fifth means M5 for detecting, as a function of the mean reflection rate Txm, the presence of the user U in the predetermined zone ZA, ZB, ZC either by using the minimum value of the time t0min, or by using the minimum value of the time t0min to which a correction coefficient K is applied.

In FIG. 2, the first, second, third, fourth, and fifth means M1, M2, M3, M4, M5 are included in the central electronic unit 10; however, some or all of these means also can be included in each of the communication units U1, U2.

Preferably, but by no means being limiting, the first, second, third, fourth, and fifth means, M1, M2, M3, M4, M5 are in software or hardware form, included on a printed circuit and connected to a microcontroller (not shown).

Ultra-wideband (UWB) is understood to mean a frequency band preferably ranging between 5 GHz and 8 GHz over a frequency range that is preferably 500 MHz.

The ultra-wideband communication units U1, U2 are each made up of a transmitter and a receiver, these means are known to a person skilled in the art and will not be described in further detail herein. Said emitted waves are generated by voltage pulses at a predetermined frequency, for example, every millisecond. A response generally comprises a single wave if said wave is not reflected by an obstacle or a wave and reflected components of said wave.

The term "strength of a wave" is understood to mean a power density, that is also called RSSI ("Received Signal Strength Indicator"), expressed in dBm, of the response on the channel for propagating the wave, or more commonly referred to as CIR "Channel Impulse Response". In the examples illustrated in FIGS. 4A, 4B, the considered parameter is the amplitude of the CIR, but an aspect of the invention is applicable, mutatis mutandis, by considering the phase of the CIR. The first means M1 comprise a clock H allowing the strength of the CIR to be determined according to the time t, they are also able to measure the strength P1 of the CIR of the first wave received at the time t0 and to compare it with a maximum strength value Pmax of all the components of this wave, i.e., of all the reflected waves, which are successively received on the first wave. This is illustrated in FIG. 4B. In FIG. 4B, P1 is the strength of the first wave received at the time t0, Pmax is the strength of a reflected component of this first wave, subsequently received at the time t1. In FIG. 4A, since there is no reflected wave, the strength of the first received wave P1 is equal to the maximum strength Pmax.

Figure 3:

FIG. 3 shows, for a response Ri, on the left of the figure, a case of the absence of reflected waves, called zero reflection Txi=0, and, on the right, a case of the presence of reflected waves, called total reflection Txi=1, of the waves emitted by the portable device SD to a communication unit U1. On the left of FIG. 3, there is no obstacle between said device SD and said unit U1, the waves propagate directly without reflecting onto obstacles, this is the case of zero reflection. On the right of the figure, a metal wall of the vehicle V is located between the portable device SD and the communication unit U1, a portion of the waves is reflected there and bypasses the obstacle, another portion of the waves passes through the obstacle but they are attenuated, this is referred to herein as total reflection.

The case of partial reflection is the case whereby, over a plurality of responses of a predetermined number "n" of responses, with at least two responses, i.e., n>2, all the plurality of responses do not propagate freely as illustrated on the left of FIG. 3, nor are they reflected as illustrated on the right of FIG. 3. More specifically, the reflection on the plurality of n responses is said to be partial, when, for some responses of said plurality, the reflection is total and, for other responses of said plurality, the reflection is zero.

The first means M1 make it possible to determine, for each response, whether or not the strength P1 of the first wave received at the time t0 is equal to the maximum strength Pmax of the response. Two cases are possible, namely $$P1 = P\max \quad [\text{Math 1}]$$

and $$P1 \neq P\max \quad [\text{Math 2}]$$

The second means M2 then determine, for each response, the absence or the presence of reflected waves as a function of the result of the comparison. If the strength P1 of the first received wave is equal to the maximum strength Pmax of the response CIR, then reflected waves are absent and a zero reflection rate is assigned to the response Ri, then Txi=0. If the strength P1 of the first wave is different from the maximum strength Pmax of the response CIR, i.e., the difference between the strength P1 and the maximum strength Pmax is greater than a predetermined threshold, TH, then reflected waves are present and a total reflection rate is assigned to the response Ri, then Txi=1.

The third means M3 then compute a mean reflection rate Txm on the responses, in this case, in the considered example, on the two responses. For example, if a first response (over the whole of the two responses) does not have reflected waves, as illustrated in FIG. 4A, then Tx1=0, and a second response has reflected waves, then Tx2=1, then the mean reflection rate Txm is equal to:

$$Txm = Tx1 + Tx2/2 * 100 \quad [\text{Math 3}]$$

In this case:

$$Txm = 1 + 1/2 * 100 = 50\% \quad [\text{Math 4}]$$

In this case, the mean reflection rate Txm is equal to 50%, i.e., it is strictly greater than 0% and strictly less than 100%, that is 0%<Tx<100%, therefore, the mean reflection rate is partial.

If each of the two responses includes reflected waves, then the mean reflection rate is total and is equal to Txm=100%, and, conversely, if none of the responses include reflected waves then the mean reflection rate is zero and equal to Txm=0%.

The fourth means M4 determine, over all the n responses, a minimum value t0min of the reception time t0 of the first wave. In other words, for each received response Ri, the reception time t0 of the first wave is determined, then a minimum value of all the first times t0min from among the plurality of n responses is determined in order to compute the distance d, d'. This is described hereafter.

If the mean reflection rate Txm over all the n responses is zero or equal to the total, i.e., equal to 0% or 100%, the fifth means M5 compute a distance d between the portable device SD and the vehicle V using the following equation:

$$d = t0/2 \min \times c \quad [\text{Math 5}]$$

With:
c: being the speed of light $3 \times 10^8$ m/s;
t0min: being the minimum value of the reception time of the first wave, measured from the emission time of the waves of the vehicle V to the portable device SD and that is determined from among all the responses.

If the mean reflection rate is partial over all the n responses, that is 0%<Txm<100%, the fifth means M5 compute a distance d' between the portable device SD and the vehicle V using the following equation:

$$d' = t0\min/2 \times c \times K \quad [\text{Math 6}]$$

With:
c: being the speed of light $3 \times 10^8$ m/s;
t0min: being the minimum value of the reception time of the first wave by the activation device D, measured from the emission time of the waves from said device D to the portable device SD (the waves make a round trip) and that is determined from among all the responses;
K: being the correction coefficient.

According to an aspect of the invention, the value of the correction coefficient K ranges between 0.6 and 0.8 and is preferably equal to:

$$K = -2 \quad [\text{Math 7}]$$

The applicant has indeed observed, (see FIG. 7), that the difference in the path between a reflected wave, illustrated by the paths B and C, and a non-reflected wave, illustrated by the path A, was such that:

$$A \geq \sqrt{2}/2(B+C) \quad [\text{Math 8}]$$

More specifically, the distance d between the portable device SD and the communication unit U1 ranges between A and (B+C), i.e., at least equal to 0.707*(B+C) and at most equal to (B+C).

In a preferred embodiment, the invention also proposes applying the method of an aspect of the invention for a plurality of n received responses, in this case the mean reflection rate Txm is equal to:

[Math 9]:

$$Txm = \frac{\sum_{i=1}^{i=n} Txi}{n} * 100$$

With:
Txi: being a value equal to 0, if the $i^{th}$ response does not contain reflected waves, and being a value equal to 1 if the $i^{th}$ response contains reflected waves;
n: being the number of responses.

Using a plurality of n response makes the computation of the distance d, d' reliable, as will be explained below.

Figure 6:
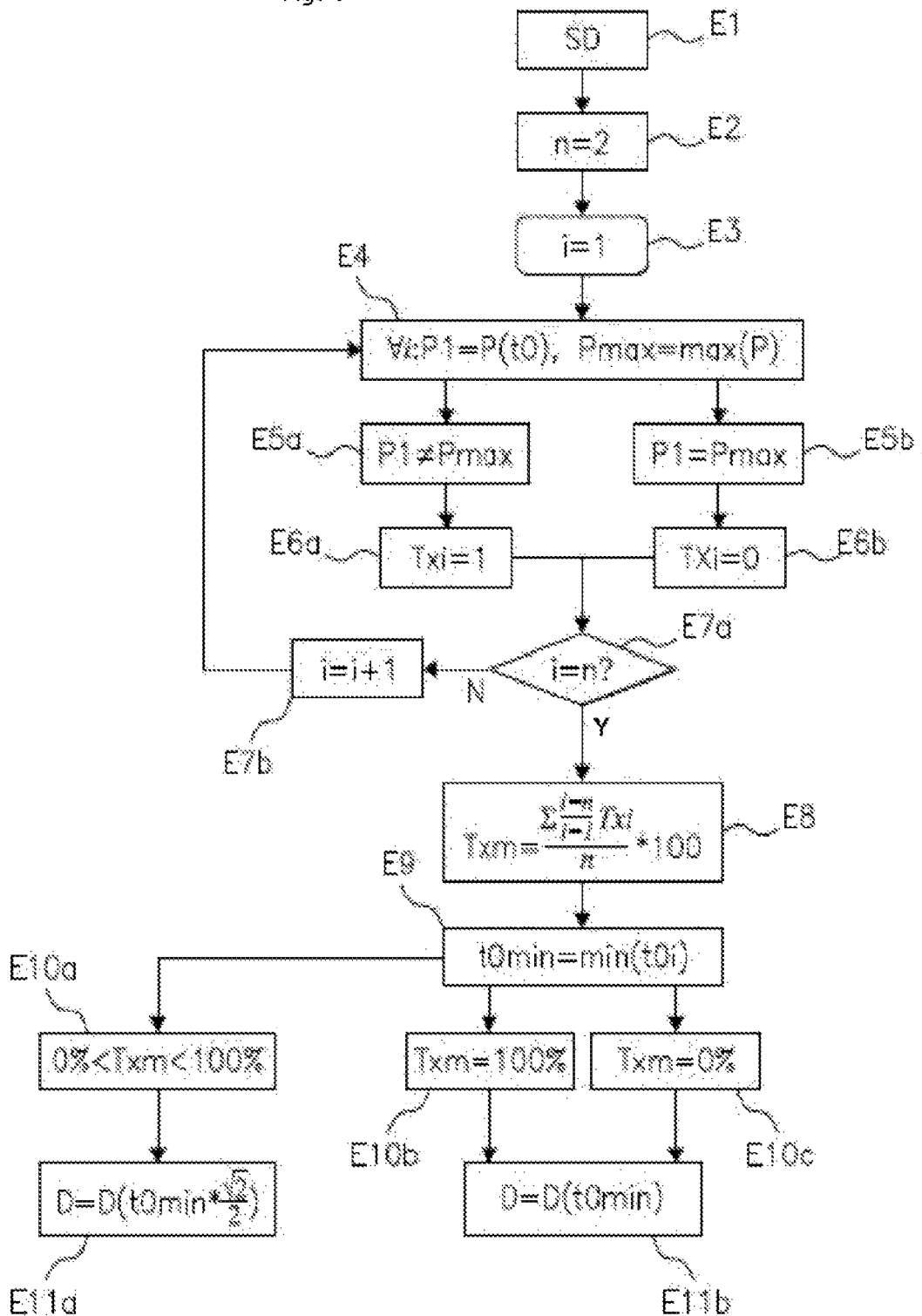
FIG. 6 is a flowchart illustrating the activation method according to an aspect of the invention.

The activation method according to an aspect of the invention, which is illustrated in FIG. 6, will now be described.

During a first step E1, the portable device SD and the activation device D communicate on ultra-wide band, said activation device D receives at least two responses (n=2, step E2) from the portable device SD comprising ultra-wideband waves. In this example, a predetermined number of responses n is considered, in this example equal to two responses (step E2), and a counter i of responses to 1 (step E3) is initialized.

Then, in the fourth step E4, for each response Ri (for the first response, i=1, then for the second response i=2, etc., until i=n), i.e., by CIR, the strength P1 of the first wave received at the time t0 and the maximum strength Pmax of all the components of said first wave that are received in said response (in the CIR) are determined.

Two cases are then possible:
a. either said strengths P1, Pmax are distinct (step E5a), in this case, it is assumed that reflected waves are present, i.e., Txi=1 (step E6a);
b. or said strengths P1, Pmax are equal (step E5b) and in this case, it is assumed that reflected waves are absent, i.e., Txi=0 (step E6b).

As long as the counter i has not reached the predetermined number n of responses (step E7a), in this case n=2, the method is repeated from step E4 for the following responses, by incrementing the counter i (step E7b).

Then, when the method has been repeated for all the n responses, in this case n=2 responses, i.e., the absence or the presence of reflected waves is determined for each response Ri, the mean reflection rate Txm is computed on the n responses as described above (step E8) ([Math 3]).

According to the activation method of an aspect of the invention, the method is repeated for a plurality n of received responses, and the mean reflection rate Txm is equal to (step E8):

[Math 10]:

$$Txm = \frac{\sum_{i=1}^{i=n} Txi}{n} * 100$$

With:
Txi: being a value equal to 0, if the $i^{th}$ response does not contain reflected waves, and being a value equal to 1 if the $i^{th}$ response contains reflected waves;
n: being the number of responses.

Then, in the following step, a minimum value of the time t0min is determined for the plurality of n responses (step E9). More specifically, for each of the responses Ri, the time t0i is determined, then, over all the plurality of n responses, the minimum value t0min of the set of said first times t0i is determined, that is:

$t0min=min(t0i)$ [Math 11]:

This minimum value of the reception time t0min of the first wave is then used in the computation of the distance d, d' (cf. "D" at FIG. 6, steps E11a and E11b).

This is illustrated in FIG. 5A. FIG. 5A shows the values of t0, for a plurality of n received responses (on the abscissa) and in the case of a total mean reflection rate, i.e., Txm=100%. The value t0 is used for the $190^{th}$ received response.

Figure 5B:
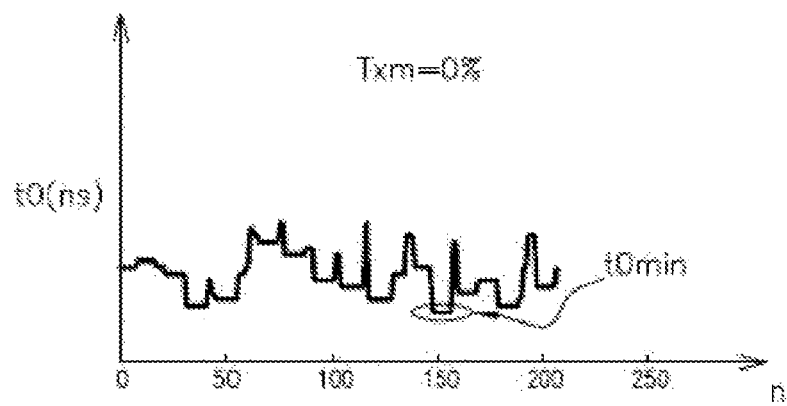
FIG. 5B is a graph showing the reception times of the first wave for a plurality of responses in the case of a zero mean reflection rate.

FIG. 5B shows the values of t0, for a plurality of a predetermined number of "n" received responses and in the case of a zero mean reflection rate Txm=0%. In the same way, the value t0 used for computing the distance d is then t0min and in this case this corresponds to the $150^{th}$ received response.

Figure 5C:
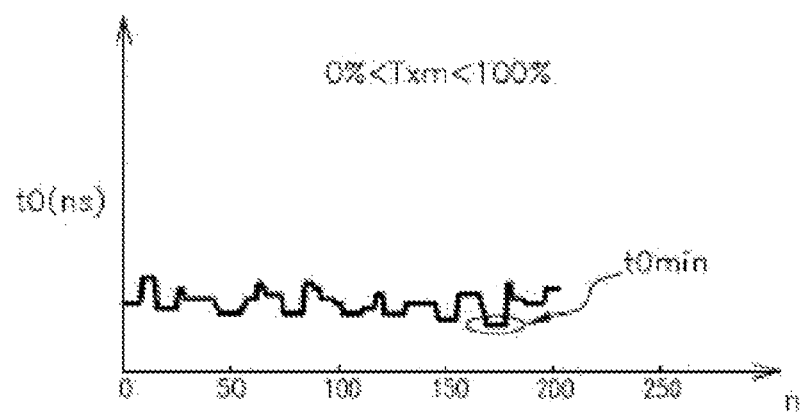
FIG. 5C is a graph showing the reception times of the first wave for a plurality of responses in the case of a partial mean reflection rate.

FIG. 5C shows the values of t0, for a plurality of n received responses and in the case of a partial mean reflection rate, that is 0%<Txm<100%. In this case of a partial mean rate, as explained above, some of the responses include reflected waves and some do not include reflected waves. In the same way, the value of the time used to compute the distance d is then t0min, which in this example corresponds to the 175th received response.

Then, the distance d, d' (see "D" at steps E11a and E11b) is computed:
a. if the mean reflection rate Txm is zero (0%) (step E10c) or total (100%) step E10b), from the minimum value t0min of the reception time of the first wave from among the plurality of n responses;
b. if the mean reflection rate Txm is partial (0%<Tx<100%), step E10a) from the minimum value of said time t0min, to which the correction coefficient K is applied according to the previously described mathematical formulas (see [Math 5] and [Math 6]).

An aspect of the invention therefore allows appropriate detection to be achieved of the presence of a user in a predetermined zone around the vehicle in a reliable and robust manner, even in the case whereby some of the waves transmitted by the portable device are subject to reflections before being received by the activation device.

The invention claimed is:

1. A method for activating a function of a motor vehicle using an activation device comprising at least one communication unit, the at least one communication unit comprising at least one radiofrequency antenna and transmission and reception means and intended to be placed on-board said vehicle and the activation coming from a portable device carried by a user, with the activation of the function being triggered by the detection of a presence of the user in a predetermined zone around the vehicle, and as a function of an authentication result of the portable device by the vehicle, the method comprising, with the activation device and the portable device communicating with each other by ultra-wideband, for at least two responses received from the portable device:
a) for each response, a strength of a first wave received at a time is compared with a maximum strength of components of the first received wave;
b) for each response, a presence or an absence of reflected waves is determined as a function of said comparison;
c) a mean reflection rate is determined on the responses;
d) a minimum value of the time is determined from among the responses;
e) if the mean reflection rate is zero or total, then the presence of the user in the predetermined zone is determined using the minimum value of the time;
f) if the mean reflection rate is partial, then the presence of the user is detected in the predetermined zone, using the minimum value of the time to which a correction coefficient is applied.

2. The activation method as claimed in claim 1, wherein the method is repeated for a plurality of responses.

3. The activation method as claimed in claim 1, wherein:
a) if the strength of the first wave is equal to the maximum strength then reflected waves are not present and a zero reflection rate equal to 0 is assigned to the response; and
b) if a difference between the strength of the first wave and the maximum strength is greater than a predetermined threshold then reflected waves are present and a total reflection rate of 1 is assigned to the response.

4. The activation method as claimed in claim 1, wherein a value of the partial mean reflection rate is strictly greater than 0% and strictly less than 100%.

5. The activation method as claimed in claim 1, wherein the correction coefficient ranges between 0.6 and 0.8.

6. The activation method as claimed in claim 1, wherein the correction coefficient is equal to $\sqrt{2}/2$.

7. An activation device for activating a vehicle function from a portable device carried by a user, the activation device comprising at least one communication unit, the at least one communication unit comprising at least one radiofrequency antenna and transmission and reception means and being intended to be placed on-board said motor vehicle, with the activation of the function being triggered by the detection of a presence of the user in a predetermined zone around the vehicle, and as a function of an authentication result of the portable device, the activation device being characterized in that it comprises ultra-wideband communication means, and in that it is adapted, for at least two responses received from the portable device:

a) to compare, for each response, a strength of a first wave received at a time with a maximum strength of components of the first received wave;

b) to determine, for each response, a presence or an absence of reflected waves as a function of the result of the comparison;

c) to compute a mean reflection rate on the responses;

d) to determine a minimum value of the time from among the responses;

e) to detect, as a function of the mean reflection rate, the presence of the user in the predetermined zone using the minimum value of the time, or the minimum value of the time to which a correction coefficient is applied.

8. The activation device as claimed in claim 7, wherein the device is further adapted to detect the presence of the user in a predetermined zone for a plurality of responses.

9. The activation device as claimed in claim 7, wherein the device is further adapted to assign a reflection rate to each response that is equal to 0 or to 1 as a function of the result of the comparison, the reflection rate is equal to 0 in the case of the absence of reflected waves, and said rate is equal to 1 in the case of the presence of reflected waves.

10. The activation device as claimed in claim 7, wherein the correction coefficient ranges between 0.6 and 0.8.

11. The activation device as claimed in claim 7, wherein the correction coefficient is equal to $\sqrt{2}/2$.

12. A motor vehicle, comprising an activation device as claimed in claim 7.

* * * * *